United States Patent
Weber

[15] 3,691,740
[45] Sept. 19, 1972

[54] GRASS CATCHER FOR REEL TYPE MOWER
[72] Inventor: Edwin J. Weber, Baltimore, Md.
[73] Assignee: The Black and Decker Manufacturing Company, Towson, Md.
[22] Filed: Sept. 17, 1970
[21] Appl. No.: 73,000

[52] U.S. Cl. .................................................. 56/198
[51] Int. Cl. ............................................ A01d 53/06
[58] Field of Search ................. 56/198, 199, 202, 206

[56] References Cited
UNITED STATES PATENTS

| 1,039,355 | 9/1912 | Boss | 56/199 |
| 3,119,136 | 1/1964 | Newsom | 56/199 X |
| 1,283,325 | 10/1918 | Schnake | 56/199 |
| 2,712,720 | 7/1955 | Kircher, Jr. | 56/199 |
| 2,494,062 | 1/1950 | Sherrow | 56/202 |

Primary Examiner—Louis G. Mancene
Assistant Examiner—J. N. Eskovitz
Attorney—Leonard Bloom and Joseph R. Slotnik

[57] ABSTRACT

A grass catcher means for a reel type lawn mower having a frame detachably secured at the upper end directly to the mower handle and the lower end supported upon the bolt means that also secure the rear wheels to the mower housing.

8 Claims, 8 Drawing Figures

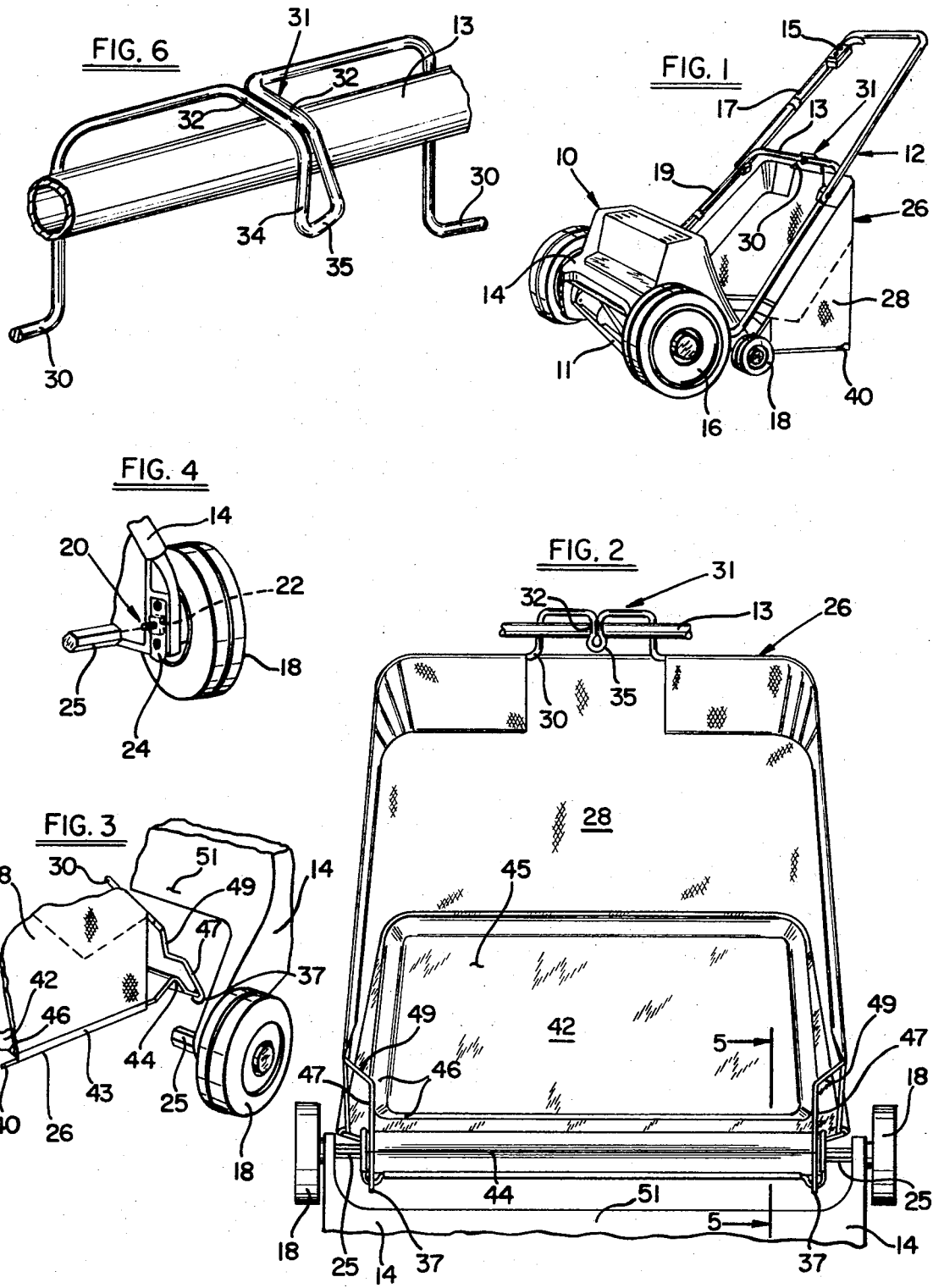

PATENTED SEP 19 1972 3,691,740

INVENTOR.
EDWIN J. WEBER
BY

3,691,740

GRASS CATCHER FOR REEL TYPE MOWER

This invention relates to reel type mowers and more particularly to a simplified means for detachably securing the catcher to the mower. The securing means utilizes the basic mower construction and requires no extra parts. The catcher and its securing means accomodates all of the adjusted mowing height positions of the mower, is secure when in position on the mower, is quickly and easily attached and detached from the mower and folds flat for easy storage.

Main objects of the present invention, therefor, are to provide an improved grass catcher and securing means therefor, which readily utilizes the basic mower parts, and is readily and securely attached to and detached from the mower without requiring special tools.

Further important objects are to provide an improved construction of the above character which automatically accomodates all adjusted mowing heights of the mower and requires no adjustment in the catcher or its securing means.

A further object of the invention is to provide a grass catcher of such construction that it may be folded relatively flat for greater convenience in packaging or for storing by the user.

A final object of this invention to be specifically enumerated herein is to provide a grass catcher attachment for reel type mowers in accordance with the preceding objects and which will conform to conventional forms of manufacture, be of simple construction and easy to use so as to provide a device that will be economically feasible, long lasting and relatively trouble free in operation.

BRIEF DESCRIPTION OF THE DRAWINGS

For a better understanding of the present invention, reference may be had to the accompanying drawings in which:

FIG. 1 is a perspective view of an electric reel type lawn mover having a grass catcher mounted thereto embodying the present invention;

FIG. 2 is a plan view of the grass catcher in the attached position as shown in FIG. 1;

FIG. 3 is a partial perspective view of the rearward portion of the mower, showing a wheel in place and a partial view of the grass catcher and frame just prior to mounting;

FIG. 4 is a partial perspective view looking toward the inner side of the mower housing and illustrating the axle nut in exploded position;

FIG. 6 is an enlarged partial perspective view showing the grass catcher attached to the mower handle;

DETAILED DESCRIPTION

Figure 5:
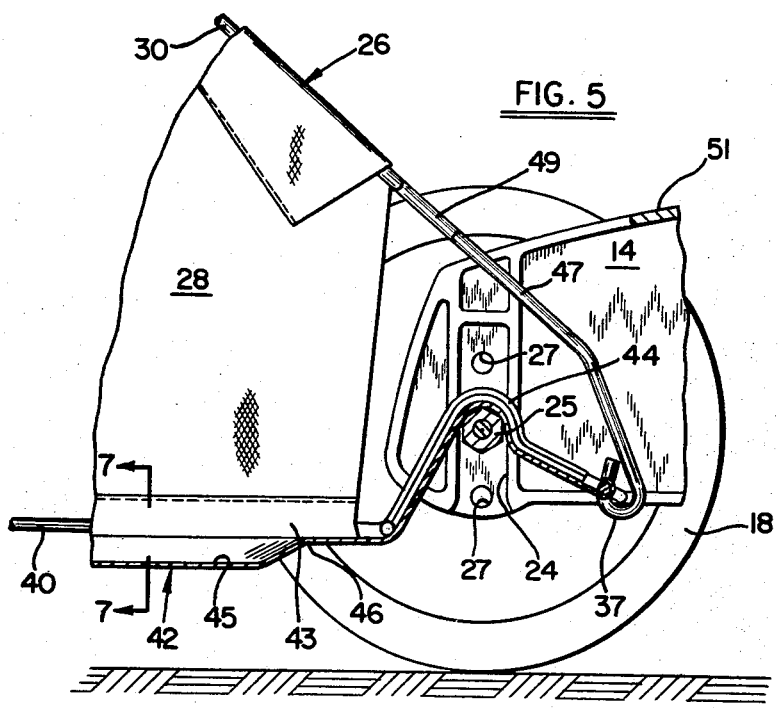
FIG. 5 is an enlarged partial elevation, taken on the line 5—5 of FIG. 2.

Referring now more specifically to the drawings the numeral 10 generally designates a cordless electric reel type lawn mower having a reel 11 driven by a motor and rotatably supported within a housing 14. As the reel 11 rotates, it cuts grass and propels the cuttings rearwardly of the mower 10. A handle 12 including foldable upper and lower parts 17 and 19, is mounted on the housing 14 and has an electric switch 15 for operating the mower. Wheels 16 are provided for supporting the forward part of the mower 10 and reel 11 while wheels 18 provide support for the rear portion of the mower.

The wheels 16 are vertically adjustable relative to the housing 14 to vary the cutting height of the reel 11. To maintain the mower 11 level, the wheels 18 are also vertically adjustably mounted to the housing 14, by means of conventional axle bolts 20, one of which is shown in FIG. 4, and which are positionable selectively through one of a plurality of vertically spaced openings 27. The bolts 20 are secured in place by standard nuts 22 which may be located within ribbed recesses 24 which are dimensioned to permit the nuts 22 to be seated within the same but prevent the nuts from turning when the axle bolts 20 are tightened. The mower 10 may be furnished without a grass catcher, in which case the standard nuts 22 are used to secure the wheels 18 to the housing 14. To adapt the mower 10 for the reception of a grass catcher 26, the nuts 24 are replaced by a longer nut for a purpose to be described.

The grass catcher 26 includes a portion 28 made of a foldable, fabric-like material, secured to an upper wire frame by a stitched seam or the like. The wire frame 30 has a hook like portion 31, provided with parallel forwardly and downwardly extending arms 32 which are formed on a radius to closely accomodate a cross bar 13 of the lower handle part 19, thereby providing a frictional retention between hook 31 and bar 13. The arms 32 are further extended to form a closed loop 35 which provides a finger grip means for detaching the hook 31 from the bar 13.

Figure 7:
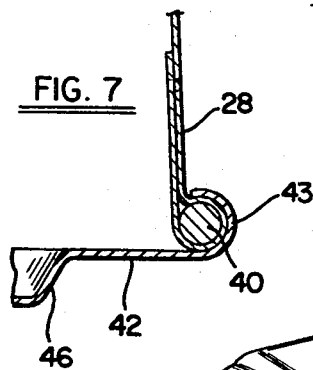
FIG. 7 is a section taken on the line 7—7 of FIG. 5.

The lower ends of the upper wire frame 30 are formed with eyelets 37 which pivotally receive a lower wire frame 40 which forms the periphery for the lower portion of the catcher 26. The catcher 26 includes a generally rectangular metal bottom plate 42 formed with a roll joint 43 along the major portion of its side edges and rear edge which secures it and the bag 28 to the lower wire frame 40. This roll joint 43, shown in FIG. 7, forms a strengthening rib for the base of the catcher 26 and reduces wear of the fabric-like portion 28 during use of the mower 11. The plate 42 is also provided with a dished portion 45 having inclined sides 46, for stiffening the plate and the forward inclined side 46 permits the bottom of the catcher to ride over any high spots in the lawn that may be encountered during the cutting operation.

Figure 8:
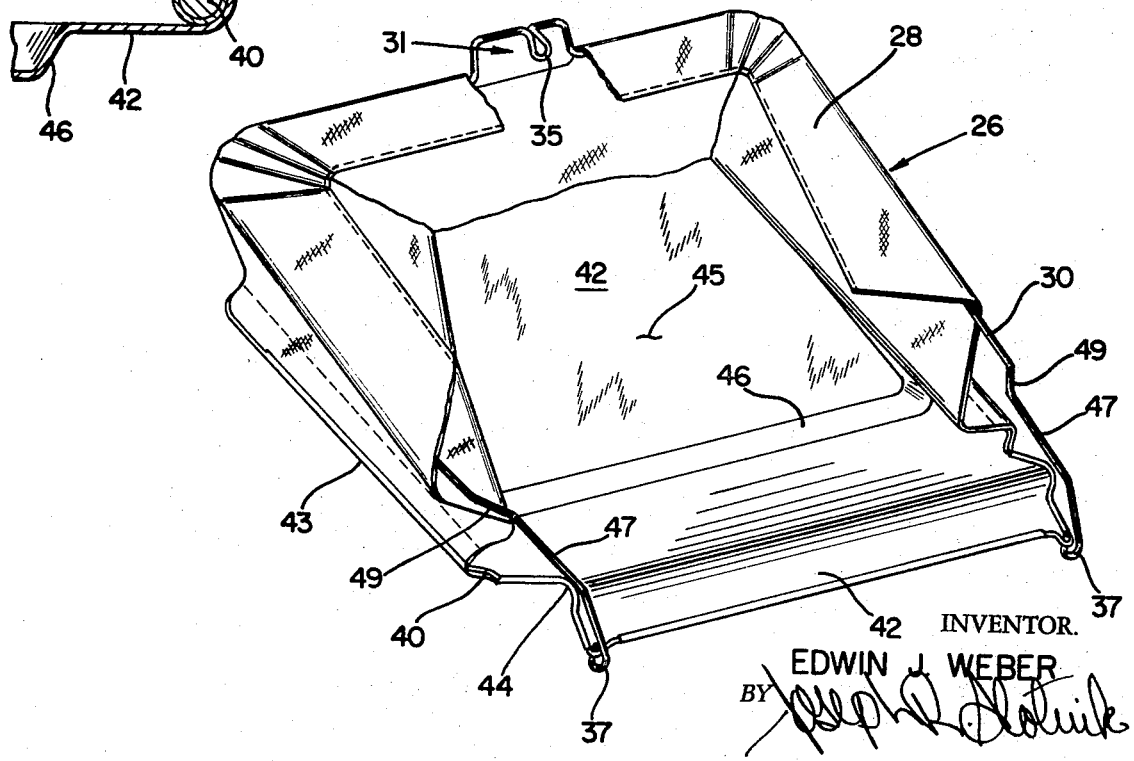
FIG. 8 is a perspective view of the catcher in a collapsed position.

The forward part of the lower wire frame 40 and bottom plate 42 are formed into a substantially inverted U-shaped configuration 44, as seen in FIGS. 3, 5 and 8, which fits over a pair of extension nuts 25 threaded on axle bolts 20 in place of the standard nuts 24. The nuts 25 are of such length to extend into U-shaped portion 44 and provide a cantilevered support means for the forward portion 44 of the grass catcher 26. It will be noted that installing the supporting nuts 25 requires no special tools, other than the implement used to remove the axle bolts 20 from the standard nuts 24. Also, the bottom plate 42, has the U-shaped configuration 44 across its entire width which, in use of the mower 11, helps to prevent grass from slipping forward and sliding off the plate 42.

It will be appreciated that since the catcher 26 is supported upon the axle nuts 25, the position of the bottom plate 42 relative to the ground is maintained constant for all adjusted positions of the wheels 18. Furthermore, the pivotal connection between the hook portion 31 and the bar 13, and the relatively deep U-shaped portion 44 accomodates the full range of vertical adjustment of the axle bolts 20 and nuts 25 (and the forward portion of the catcher 26). Also, the catcher 26 is securely attached to and firmly supported upon integral parts of the mower 11 and requires no extra parts, only replacement of the standard nuts 22 with the extended nuts 25. The catcher 26 cannot come loose during use of the mower 11 since the hook portion 31 prevents rearward movement of the catcher 26 off the extended nuts 25. A horizontal wall 51 forms a shelf which limits upward pivotal movement of the catcher 26 from the extended nuts 25.

The grass catcher 26 is illustrated in FIG. 8 in a folded position prior to storing or packaging. The wire frame 30 is formed with an outwardly offset portion 49 on each of its leg members 47. The offset portions 49 provide a width to the upper portion of the wire frame 30 that is greater than the width of the lower frame 40, whereby facilitating the folding of the bag 28 and frame assembly into a relatively flat plane for maximum space saving in storing or for placing into the flatest possible box when packaging.

In summation, a grass catcher has been described herein which includes a foldable, lightweight, and inexpensive design particularly adapted for prolonged life and for economical storing and transportation; wherein in use the grass catcher is readily attached to and detached from a reel type mower; the catcher is readily removed for dumping the cuttings, and just as easily re-attached for further cutting; and wherein in adapting the mower for use with the grass catcher no special tools are required or parts other than the extension nuts.

Some changes may be made in the construction and arrangement of my grass catcher without departing from the real spirit and purpose of my invention, and it is my intention to cover by my claims any modified forms or structure of mechanical equivalents which may be reasonably included within their scope.

I claim:

1. In a lawnmower of the type having a housing including generally parallel side walls, a reel rotatably supported upon said housing between said side walls, a pair of front wheels and a pair of rear wheels supported upon said housing, and a handle extending upwardly and rearwardly from said housing for control and manipulation of said mower; the improvement which comprises grass catcher means disposed behind said reel and adapted to catch grass cuttings propelled by said reel, said grass catcher means including a frame detachably secured at one end directly to said handle, the other end of said frame being supported inboard of said side walls upon bolt means secured to said housing, said bolt means also securing said rear wheels to said housing outboard of said side walls.

2. In a lawn mower of the type having a housing including generally parallel side walls, a reel rotatably supported upon said housing between said side walls, a pair of front wheels and a pair of rear wheels supported upon said housing, and a handle extending upwardly and rearwardly from said housing for control and manipulation of said mower; the improvement which comprises grass catcher means disposed behind said reel and adapted to catch grass cuttings propelled by said reel, said grass catcher means including a bottom pan having recess means near its forward end, bolt means securing said reel wheels to said housing and received in said pan recess means for support of the forward end of said pan, a single wire member attached to the front of said pan and extending upwardly and rearwardly therefrom and releasably attached directly to said handle, whereby said grass catcher means is removable from said mower by releasing said wire member from said handle.

3. The improvement of claim 2 wherein said pan is formed with an inverted, generally U-shaped configuration which defines said recess means.

4. A grass catcher comprising a bottom pan, a wire frame including first and second pivotally interconnected portions, said first portion laying substantially along opposite side edges and the back edge of said pan, a bag secured to said second wire frame portion and secured between said first wire frame portion and rolled portions of said pan along said side edges and said back edge.

5. A grass catcher as defined in claim 4 wherein said second wire frame portion includes means integral therewith adapted to secure said catcher directly to a mower handle.

6. A grass catcher as defined in claim 4 wherein said first wire frame portion substantially circumscribes said pan and is secured thereto by rolled edges of said pan throughout nearly its entire periphery.

7. A grass catcher as defined in claim 4 wherein said first and second wire frame portions are adapted to pivot to a closed position one adjacent the other, said bag adapted to collapse when said wire frame portions are closed, whereby said catcher folds flat for easy storage.

8. A grass catcher as defined in claim 7 wherein said second wire frame portion lies outside said first wire frame portion when said wire frame portions are closed.

* * * * *